United States Patent
Barros et al.

(10) Patent No.: US 11,043,031 B2
(45) Date of Patent: Jun. 22, 2021

(54) CONTENT DISPLAY PROPERTY MANAGEMENT

(71) Applicant: GOOGLE LLC, Mountain View, CA (US)

(72) Inventors: Brett Barros, Millbrae, CA (US); Xavier Benavides Palos, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/167,169

(22) Filed: Oct. 22, 2018

(65) Prior Publication Data
US 2019/0122440 A1    Apr. 25, 2019

Related U.S. Application Data

(60) Provisional application No. 62/574,984, filed on Oct. 20, 2017.

(51) Int. Cl.
*G06T 19/00* (2011.01)
*G06F 3/03* (2006.01)
(Continued)

(52) U.S. Cl.
CPC .......... *G06T 19/006* (2013.01); *G06F 3/011* (2013.01); *G06F 3/0304* (2013.01); *G06T 7/75* (2017.01); *G06T 19/20* (2013.01)

(58) Field of Classification Search
CPC ...... C12N 15/52; C12N 15/79; C12N 15/907; C12N 9/00; C12N 9/22; C12Y 301/22;
(Continued)

(56) References Cited

U.S. PATENT DOCUMENTS

2007/0038944 A1*  2/2007  Carignano .............. G06T 15/20
                                                      715/757
2013/0215148 A1*  8/2013  Antonyuk ............... G06F 3/017
                                                      345/633
(Continued)

FOREIGN PATENT DOCUMENTS

EP         1720131 A1    11/2006
WO      2013023706 A1     2/2013
WO      2016132822 A1     8/2016

OTHER PUBLICATIONS

International Search Report and Written Opinion for International Application No. PCT/US2018/056913, dated Feb. 1, 2019, 14 pages.
(Continued)

*Primary Examiner* — Sing-Wai Wu
(74) *Attorney, Agent, or Firm* — Brake Hughes Bellermann LLP

(57) ABSTRACT

Systems and methods for inserting and transforming content are provided. For example, the inserted content may include augmented reality content that is inserted into a physical space or a representation of the physical space such as an image. An example system and method may include receiving an image and identifying a physical location associated with a display management entity within the image. The example system and method may also include retrieving content display parameters associated with the display management entity. Additionally, the example system and method may also include identifying content to display and displaying the content using the display parameters associated with the display management entity.

20 Claims, 11 Drawing Sheets

(51) Int. Cl.
 *G06T 7/73* (2017.01)
 *G06F 3/01* (2006.01)
 *G06T 19/20* (2011.01)

(58) Field of Classification Search
 CPC ...... G06F 3/011; G06F 3/0304; G06T 19/006;
 G06T 19/20; G06T 7/75
 See application file for complete search history.

(56) References Cited

U.S. PATENT DOCUMENTS

| | | | |
|---|---|---|---|
| 2014/0002498 A1* | 1/2014 | Lee | G06T 19/20 345/633 |
| 2014/0368534 A1 | 12/2014 | Salter et al. | |
| 2015/0070347 A1* | 3/2015 | Hofmann | G06K 9/00208 345/419 |
| 2017/0315364 A1* | 11/2017 | Masumoto | H04N 13/106 |
| 2018/0049622 A1* | 2/2018 | Ryan | G06Q 20/387 |

OTHER PUBLICATIONS

Breen, et al., "Interactive Occlusion and Collision of Real and Virtual Objects in Augmented Reality", Technical report ECRC-95-02, European Computer-Industry Research Centre, 1995, 22 pages.
Reitmayr, et al., "Collaborative Augmented Reality for Outdoor Navigation and Information Browsing", Conference Paper, Interactive Media Systems Group, Vienna University of Technology, Jan. 2004, 11 pages.

\* cited by examiner

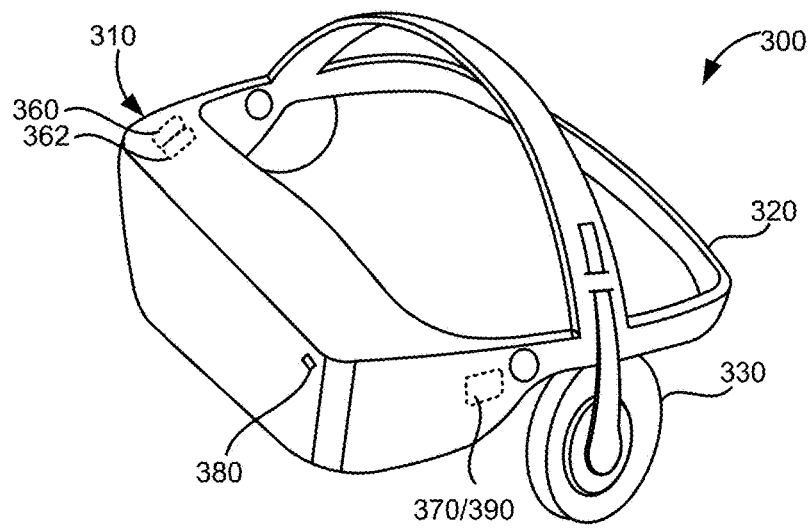
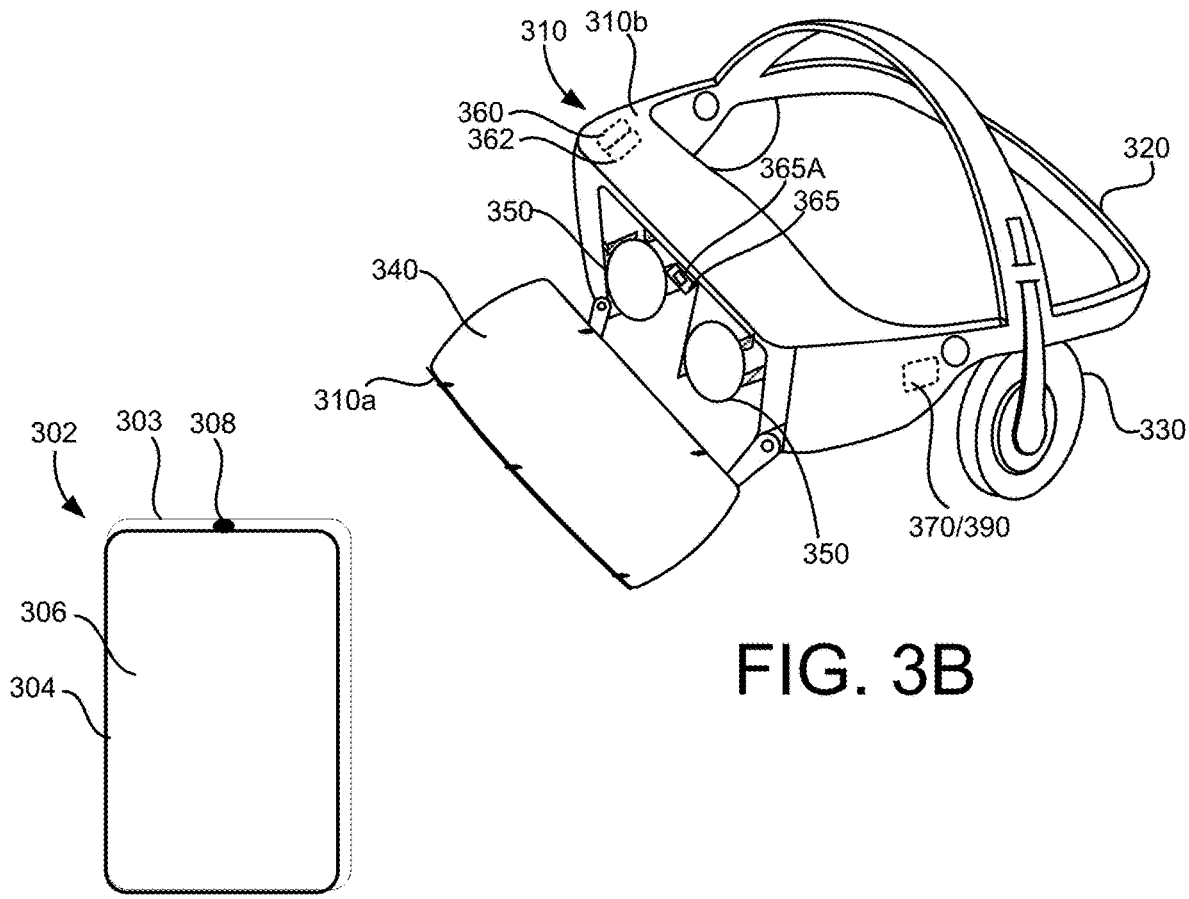

CONTENT DISPLAY PROPERTY MANAGEMENT

CROSS-REFERENCE TO RELATED APPLICATION

This application claims priority to U.S. Application No. 62/574,984 filed on Oct. 20, 2017, the disclosure of which is incorporated herein by reference in its entirety.

BACKGROUND

Content may be inserted into an image or a user's field of view or otherwise tracked within a three-dimensional (3D) environment. For example, an augmented reality (AR) system may generate an immersive augmented environment for a user by inserting content. The immersive augmented environment can be generated by superimposing computer-generated content on a user's field of view of the real world. For example, the computer-generated content can include labels, textual information, images, sprites, and three-dimensional entities. The computer-generated content may be displayed at a position in the user's field of view so as to appear to overlay an object in the real world and be spatially retained relative to the real word even when outside of the user's field of view. Similarly, the computer-generated content may be overlaid on a displayed image. Various properties may be used to display the computer-generated content in a particular environment.

SUMMARY

This disclosure describes systems and methods for managing properties that are used in displaying inserted content. For example, the inserted content may be displayed using a content display property entity that is associated with a physical location and at least one content display property.

In one aspect, a non-transitory computer-readable storage medium comprising instructions stored thereon that, when executed by at least one processor, are configured to cause a computing system to at least: receive an image; identify a physical location associated with a display management entity within the image; retrieve content display parameters associated with the display management entity; identify augmented reality content to display; and display the augmented reality content at the physical location using the display parameters associated with the display management entity.

In another aspect, a method comprising: associating a display management entity with a physical location in a physical space; determining a display parameter for the display management entity; and storing the display parameter.

In yet another aspect, a system comprising: at least one processor; and memory storing instructions that, when executed by the at least one processor, cause the system to: associate a first display management entity with a first physical location in a physical space; store first display parameters for the first display management entity; associate a second display management entity with a second physical location in the physical space; store second display parameters for the second display management entity; display first augmented reality content at the first location using the first display parameters; and display second augmented reality content at the second location using the second display parameters.

The details of one or more implementations are set forth in the accompanying drawings and the description below. Other features will be apparent from the description and drawings, and from the claims.

BRIEF DESCRIPTION OF THE DRAWINGS

FIGS. 3A, 3B, and 3C are diagrams depicting an example head-mounted display device and controller, in accordance with implementations as described herein.

DETAILED DESCRIPTION

Figure 1:
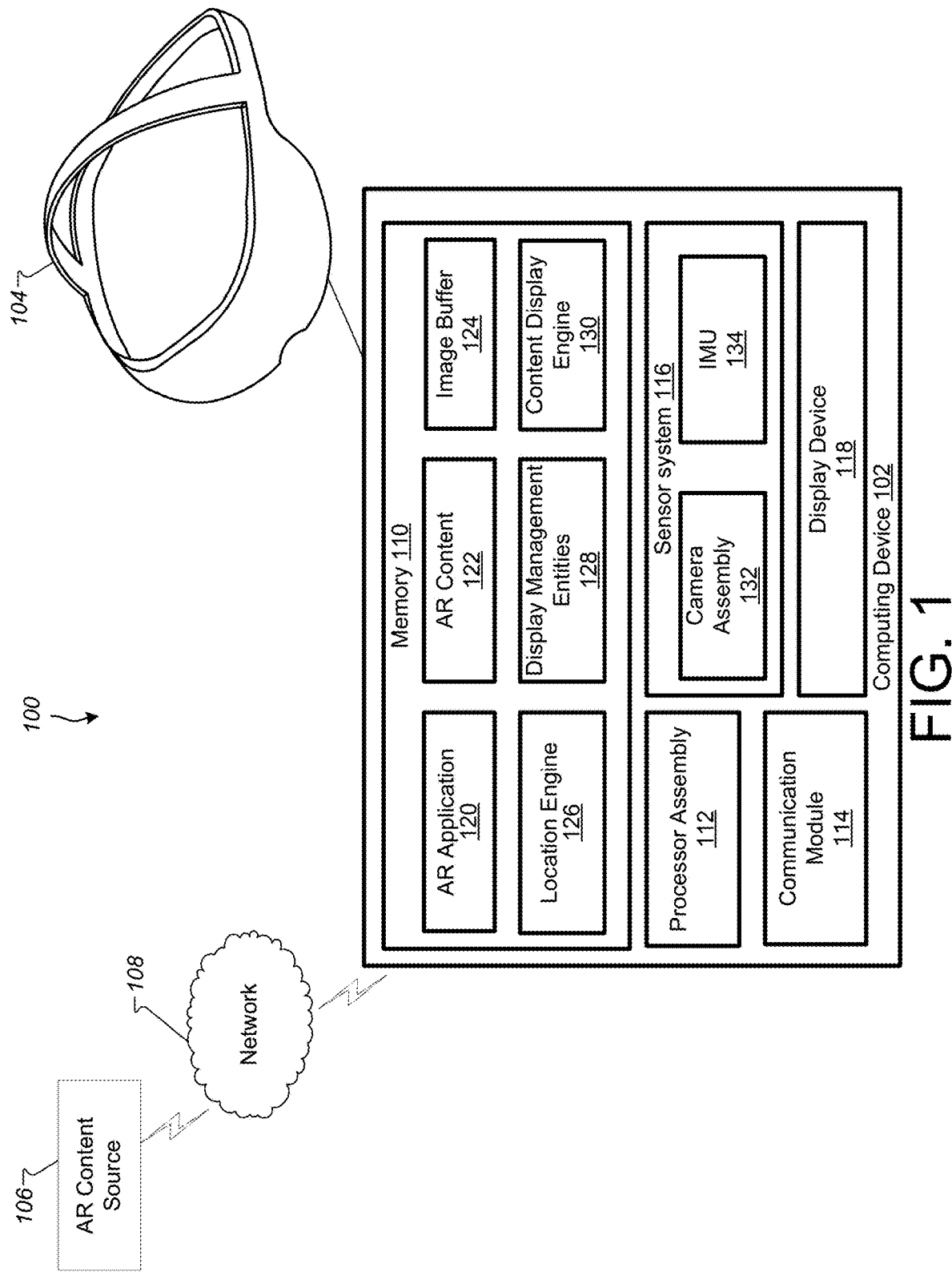
FIG. 1 is a block diagram illustrating a system according to an example implementation.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Augmented reality (AR) systems include systems that insert computer-generated content into a user's perception of the physical space surrounding the user. The computer-generated content may include labels, textual information, images, sprites, and three-dimensional entities. In some implementations, the content is inserted for entertainment, educational, or informational purposes. As an example, an augmented reality system may allow students to take a virtual field trip. During the virtual field trip, students may be able to view content representing artifacts, animals, and other entities using augmented reality. In some embodiments, the content is displayed sequentially at one or more physical locations in the physical space the user occupies.

The physical locations may be associated with display management entities (e.g., the physical locations may have a 1-to-1 relationship with the display management entities). In some implementations, data management entities are instances of a data structure that store various types of data. For example, display management entities may be stored in a memory device, a file, or a database. In some implementations, the data management entity stores coordinates of a physical location or is otherwise associated with a physical location. A display management entity may, for example, store one or more display parameters that can be used when displaying content at an associated physical location.

Non-limiting examples of the display parameters include a display size parameter, a display orientation parameter, and a display offset parameter, for one or more dimensions. The display parameter may, for example, be set to fit the surrounding physical space. As content is displayed at the physical location, the display parameter can be applied to the content. In this manner, the content can be sized appropriately, positioned well for viewing, and oriented properly. The display management entity may also be associated with a physical or digital visual entity, such as a surface or stage that can be displayed beneath the content. Although many of the example herein relate to visual content and display parameters, some implementations apply similar concepts to audio content and parameters too. For example, the display management entity may be associated with parameters for presenting audio content, such as an audio volume parameter and an offset parameter (e.g., to control from where the sound emanates or seems to emanate).

A teacher or guide can facilitate the virtual field trip and may, for example, select, switch, or otherwise manage the content shown to a group of students or visitors during the virtual field trip. Alternatively, a user may independently explore the content of the virtual field trip without a teacher or guide. In some implementations, as the virtual field trip progresses the content shown at a particular physical location changes. For example, a set of content may be displayed sequentially at a particular location, and the content displayed at a particular location may change in response to a user input or based on a particular amount of time elapsing. As different content is displayed, the display parameters of the display management entity associated with the physical location may be applied to the content. In this manner, a sequence of content may be shown at the physical location such that all of the content items in the sequence are displayed in a similar manner (e.g., using the same display parameters).

In some implementations, the content items of the sequence may shift through a sequence of physical locations in which the content items are displayed at each of the physical locations using the associated display management entity. For example, a class may participate in a virtual field trip where content is shown at three or more locations. The students can be divided into small groups that are assigned to the locations. The content items can then move between the physical locations and be displayed appropriately for that physical location based on the associated display management entity. The content may, for example, be updated based on a user input (e.g., an action or voice command) from a user implicitly interacting with the content (e.g., viewing the content) or an input from another user (e.g., a guide or teacher).

An example AR system is a portable electronic device, such as a smartphone, that includes a camera and a display device. The portable electronic device may capture images using the camera and show AR images on the display device. The AR images may include computer-generated content overlaid upon the images captured by the camera.

Another example AR system includes a head-mounted display (HMD) that is worn by a user. The HMD includes a display device that is positioned in front of a user's eyes. For example, the HMD may occlude the user's entire field of view so that the user can only see the content displayed by the display device. In some examples, the display device is configured to display two different images, one that is viewable by each of the user's eyes. For example, at least some of the content in one of the images may be slightly offset relative to the same content in the other image so as to generate the perception of a three-dimensional scene due to parallax. In some implementations, the HMD includes a chamber in which a portable electronic device, such as a smartphone, may be placed so as to permit viewing of the display device of the portable electronic device through the HMD.

Another example AR system includes a HMD that permits the user to see the physical space while the HMD is being worn. The HMD may include a micro-display device that displays computer-generated content that is overlaid on the user's field of view. For example, the HMD may include an at least partially transparent visor that includes a combiner that permits light from the physical space to reach the user's eye while also reflecting images displayed by the micro-display device toward the user's eye.

When computer-generated content is inserted into an image, various transformations and/or parameters may be applied to the content so that the content more closely fits the physical space in which the content is being inserted. For example, the content may be positioned, scaled, and oriented to fit the physical space. It may be tedious and time consuming for a user such as a teacher or guide to adjust the position, orientation, and scale of each of the content items to fit the space. Furthermore, interacting with the AR system to make these adjustments may require receiving additional user interactions that must be processed using additional processor cycles. The techniques described further herein allow for displaying inserted content at particular locations using display parameters that are appropriate for that location. These techniques allow users to spend more time looking at, interacting with, and learning about the content rather than, for example, scaling, positioning, and orienting the content. Furthermore, the techniques described herein require the AR system to use fewer processor cycles for user interaction to position, scale, and orient content.

Additionally, due to the reduced number of processing cycles required by the techniques described herein, these techniques may allow for inserting content into a captured image/video in a manner that fits the surrounding space more quickly, with less user interaction, and while using less power than traditional techniques would require. This reduced power requirement may be particularly important in AR systems that include battery-operated mobile devices.

An example AR system captures images of the physical space surrounding a user. The system may then determine a physical location associated with a display management entity within one or more of the captured images. For example, the system may identify a physical marker such as a QR code, picture, sticker, or other type of visual indicator within the physical space. The sticker may be formed from a paper of vinyl material and an adhesive, which may be used to permanently or temporarily attach the sticker to a surface in the physical space. The stickers may be configured to allow for removal and reattachment within the physical space.

In some implementations, the physical location is determined based on a coordinate system being mapped to the captured images based on determining a location of the AR system based on using, for example, a visual positioning system or global positioning system. Content may then be identified to insert at the physical location. The content may be adjusted based on content display properties (also referred to as display properties) associated with the display management entity. For example, the display management entity may be associated with a size parameter that defines a target size for content. The identified content may then be scaled to the target size. The display management entity may also define an offset parameter, which, for example, defines a vertical offset from the marker to display the content. The display management entity may also define an orientation parameter that defines an orientation for the content (e.g., a direction the content should face).

The adjusted content can then be displayed using the content display properties associated with the display management entity. The adjusted content may be displayed at the determined physical location. For example, displaying the adjusted content may include adding the adjusted content to an AR environment at the determined physical location. The adjusted content may overlaid on the user's field of view at a position in the user's field of view that corresponds to the determined physical location.

Additionally, the system may generate a visual entity associated with the display management entity at the physical location. The visual entity may include a surface that is rendered beneath the content. For example, the visual entity may resemble a stage. The system may also generate a visual indication of the scale of the content (e.g., a textual indicator, a re-sized common object) that is displayed near the content. In some implementations, a group of users views the adjusted content together as part of a virtual field trip. At various times, a teacher or guide may load new content at the physical location. The system may then adjust and display the new content based on the associated display management properties.

Although many examples described herein relate to AR systems inserting visual content into an AR environment, content may be inserted using the techniques described herein in other systems too. For example, the techniques described herein may be used to insert content into an image or video.

FIG. 1 is a block diagram illustrating a system 100 according to an example implementation. The system 100 generates an augmented reality (AR) environment for a user of the system 100. In some implementations, the system 100 includes a computing device 102, a head-mounted display device (HMD) 104, and an AR content source 106. Also shown is a network 108 over which the computing device 102 may communicate with the AR content source 106.

The computing device 102 may include a memory 110, a processor assembly 112, a communication module 114, a sensor system 116, and a display device 118. The memory 110 may include an AR application 120, AR content 122, an image buffer 124, a location engine 126, display management entities 128, and a content display engine 130. The computing device 102 may also include various user input components (not shown) such as a controller that communicates with the computing device 102 using a wireless communications protocol. In some implementations, the computing device 102 is a mobile device (e.g., a smartphone) which may be configured to provide or output AR content to a user via the HMD 104. For example, the computing device 102 and the HMD 104 may communicate via a wired connection (e.g., a Universal Serial Bus (USB) cable) or via a wireless communication protocol (e.g., any WiFi protocol, any BlueTooth protocol, Zigbee, etc.). In some implementations, the computing device 102 is a component of the HMD 104 and may be contained within a housing of the HMD 104.

The memory 110 can include one or more non-transitory computer-readable storage media. The memory 110 may store instructions and data that are usable to generate an AR environment for a user.

The processor assembly 112 includes one or more devices that are capable of executing instructions, such as instructions stored by the memory 110, to perform various tasks associated with generating an AR environment. For example, the processor assembly 112 may include a central processing unit (CPU) and/or a graphics processor unit (GPU). For example, if a GPU is present, some image/video rendering tasks, such as adjusting and rendering content using display parameters from a display management engine, may be offloaded from the CPU to the GPU.

The communication module 114 includes one or more devices for communicating with other computing devices, such as the AR content source 106. The communication module 114 may communicate via wireless or wired networks, such as the network 108.

The sensor system 116 may include various sensors, such as a camera assembly 132. Implementations of the sensor system 116 may also include other sensors, including, for example, an inertial motion unit (IMU) 134, a light sensor, an audio sensor, an image sensor, a distance sensor, a proximity sensor, a contact sensor such as a capacitive sensor, a timer, and other sensors or different combinations of sensors.

The IMU 134 detects one or more of motion, movement, and acceleration of the computing device 102 or the HMD 104. The IMU 134 may include various different types of sensors such as, for example, an accelerometer, a gyroscope, a magnetometer, and other such sensors. A position and orientation of the HMD 104 may be detected and tracked based on data provided by the sensors included in the IMU 134. The detected position and orientation of the HMD 104 may allow the system to detect and track the user's gaze direction and head movement.

In some implementations, the AR application may use the sensor system 116 to determine a location and orientation of a user within a physical space or to recognize features or objects within the physical space.

The camera assembly 132 captures images (or videos) of the physical space around the computing device 102. The camera assembly 132 may include one or more cameras. The camera assembly 132 may also include an infrared camera. Images captured with the camera assembly 132 may be used to determine a location and orientation of the computing device 102 within a physical space, such as an interior space. For example, the computing device 102 may include a visual positioning system that compares images captured by the camera assembly 132 (or features extracted from those images) to a known arrangement of features within a physical space to determine the location of the computing device 102 within the space.

The AR application 120 may present or provide AR content to a user via the HMD and/or one or more output devices of the computing device 102 such as the display device 118, speakers, and/or other output devices. In some implementations, the AR application 120 includes instructions stored in the memory 110 that, when executed by the processor assembly 112, cause the processor assembly 112 to perform the operations described herein. For example, the AR application 120 may generate and present an AR environment to the user based on, for example, AR content, such as the AR content 122 and/or AR content received from the AR content source 106. The AR content 122 may include content such as images or videos that may be displayed on a portion of the user's field of view in the HMD 104. For example, the AR application 120 may generate content corresponding to a virtual field trip for one or more users (e.g., the AR application 120 may coordinate display of AR content with other computing devices, such as computing devices being used by other students who are also participating in the virtual field trip). The content may include objects that overlay various portions of the physical space. The content may be rendered as flat images or as three-dimensional (3D) objects. The 3D objects may include one or more objects represented as polygonal meshes. The polygonal meshes may be associated with various surface textures, such as colors and images.

The AR application 120 may use the image buffer 124, location engine 126, display management entities 128, and content display engine 130 to generate images for display via the HMD 104 based on the AR content 122. For example, one or more images captured by the camera assembly 132 may be stored in the image buffer 124. The AR application 120 may use the location engine 126 to determine one or more physical locations within the images to insert content. For example, the location engine 126 may analyze the images to identify features within the image so that the images can be mapped to a coordinate system associated with physical locations for displaying content. Additionally, the location engine 126 may analyze the images to identify markers associated with physical location for displaying content. The markers and/or coordinates of physical locations may be defined by a user during setup, while the relative properties of content to be displayed could be defined during setup or in a tour creator mode of the AR application 120 (or another application).

Once a physical location has been identified, the AR application 120 may then identify a display management entity associated with the identified physical location from the display management entities 128. The content display engine 130 can then display content at the identified physical location using display properties from the identified display management entity. The AR application 120 may, for example, determine which content to display at any given time and when to update/change the content. In some implementations, the AR application 120 may simultaneously display different content at multiple different physical locations identified by the location engine 126.

In some implementations, the content display engine 130 also generates a visual entity associated with the physical location and/or the associated display management entity that is independent of the content being displayed. For example, the content display engine 130 may display a surface at a location that will be beneath the content. The surface may allow the content to cast a shadow on a solid digital plane, where the real-world planar understanding may otherwise be insufficient. The surface may also draw attention to the physical location (e.g., even when other content is not being displayed). The visual entity may include additional structures too, such as a cylinder or platform so as to appear like a stage.

Additionally, the content display engine 130 may generate a scale visual entity to be displayed near the content. For example, the scale visual entity may be a textual indication of the scale (e.g., 1:2, 1:10, etc.). In some implementations, the scale visual entity includes a scaled representation of a common object that can provide an indication of the content with respect to that common object. The common object of the scale visual entity could be a strand of hair (e.g., for small/microscopic content such as a blood cell), a basketball (e.g., for mid-sized content such as most mammals), or a school bus (e.g., for large content such as dinosaurs or whales). By displaying the content in relation to these scale visual entities, viewers may be able to more intuitively comprehend the size of the content being viewed.

In some implementations, the AR application 120 may also generate various other visual entities at an identified physical location. For example, the AR application 120 may generate regions on a surface generated beneath the content to solicit user input. The user input may be, for example, answers to quiz questions, votes on content to display next, or commands to adjust the display of the content, etc. A user may hold their hand over or move a physical object (e.g., a coin) into a region associated with a particular input (e.g., a "Yes" region and a "No" region) to vote or answer a quiz. The AR application 120 may also interpret various user actions based on an identified physical location and/or an associated display management entity. For example, a user hand gesture may reach into a region associated with an identified physical location (e.g., based on an offset and size parameter of the associated display management entity) and then pull back. The pull back may be interpreted as a gesture to alter the content being displayed (e.g., to scale the content, rotate the content, or move the content). The gesture may also cause a user interface to be shown that allows the user to control a display management entity or interact with the content. In some implementations, the user interface is specific to the content that is being displayed.

In some implementations, the AR application 120 may also be configured to receive a user input (e.g., a gesture, voice command, actuation of a button, or other type of input) that causes the content to be displayed at its actual real-world size. For example, responsive to receiving the user input an animation scaling the content from its current size to its actual real-world size may be shown. The AR application 120 may also be configured to receive a user input to scale content based on the relative size of the content with respect to other content (e.g., previously displayed content or content being displayed at another physical location). The AR application 120 may, for example, support three or more scaling modes, such as a fit-content-to-size-parameter mode, a real-world size mode, and a relative mode, that can be selected via a user interface. For example, when active (e.g., selected be a user or teacher), the fit-content-to-size parameter mode causes the content to be scaled to a specified size parameter when displayed. When active, the real-world size mode may cause the content to be displayed at its real-world size. When active, the relative mode may cause the content to be displayed at size that is scaled by the same factor as other content (e.g., previously displayed content or content displayed elsewhere).

In some implementations, the image buffer 124 is a region of the memory 110 that is configured to store one or more images. In some implementations, the computing device 102 stores images captured by the camera assembly 132 as a texture within the image buffer 124. In some implementations, the image buffer may also include a memory location that is integral with the processor assembly 112, such as dedicated random access memory (RAM) on a GPU.

In some implementations, the location engine 126 and content display engine 130 may include instructions stored in the memory 110 that, when executed by the processor assembly 112, cause the processor assembly 112 to perform operations described herein to generate an image or series images that are displayed to the user (e.g., via the HMD 104). The display management entities 128 may include data stored in memory.

The AR application 120 may update the AR environment based on input received from the camera assembly 132, the IMU 134, and/or other components of the sensor system 116. For example, the IMU 134 may detect motion, movement, and/or acceleration of the computing device 102 and/or the HMD 104. The IMU 134 may include various different types of sensors such as, for example, an accelerometer, a gyroscope, a magnetometer, and other such sensors. A position and orientation of the HMD 104 may be detected and tracked based on data provided by the sensors included in the IMU 134. The detected position and orientation of the HMD 104 may allow the system to detect and track the user's position and orientation within a physical space. Based on the detected position and orientation, the AR application 120 may update the AR environment to reflect a changed orientation and/or position of the user within the environment.

Although the computing device 102 and the HMD 104 are shown as separate devices in FIG. 1, in some implementations, the computing device 102 may include the HMD 104. In some implementations, the computing device 102 communicates with the HMD 104 via a cable, as shown in FIG. 1. For example, the computing device 102 may transmit video signals and/or audio signals to the HMD 104 for display for the user, and the HMD 104 may transmit motion, position, and/or orientation information to the computing device 102.

The AR content source 106 may generate and output AR content, which may be distributed or sent to one or more computing devices, such as the computing device 102, via the network 108. In an example implementation, the AR content includes three-dimensional scenes and/or images. Additionally, the AR content may include audio/video signals that are streamed or distributed to one or more computing devices. The AR content may also include an AR application that runs on the computing device 102 to generate 3D scenes, audio signals, and/or video signals.

The network 108 may be the Internet, a local area network (LAN), a wireless local area network (WLAN), and/or any other network. A computing device 102, for example, may receive the audio/video signals, which may be provided as part of AR content in an illustrative example implementation, via the network.

Figure 2:
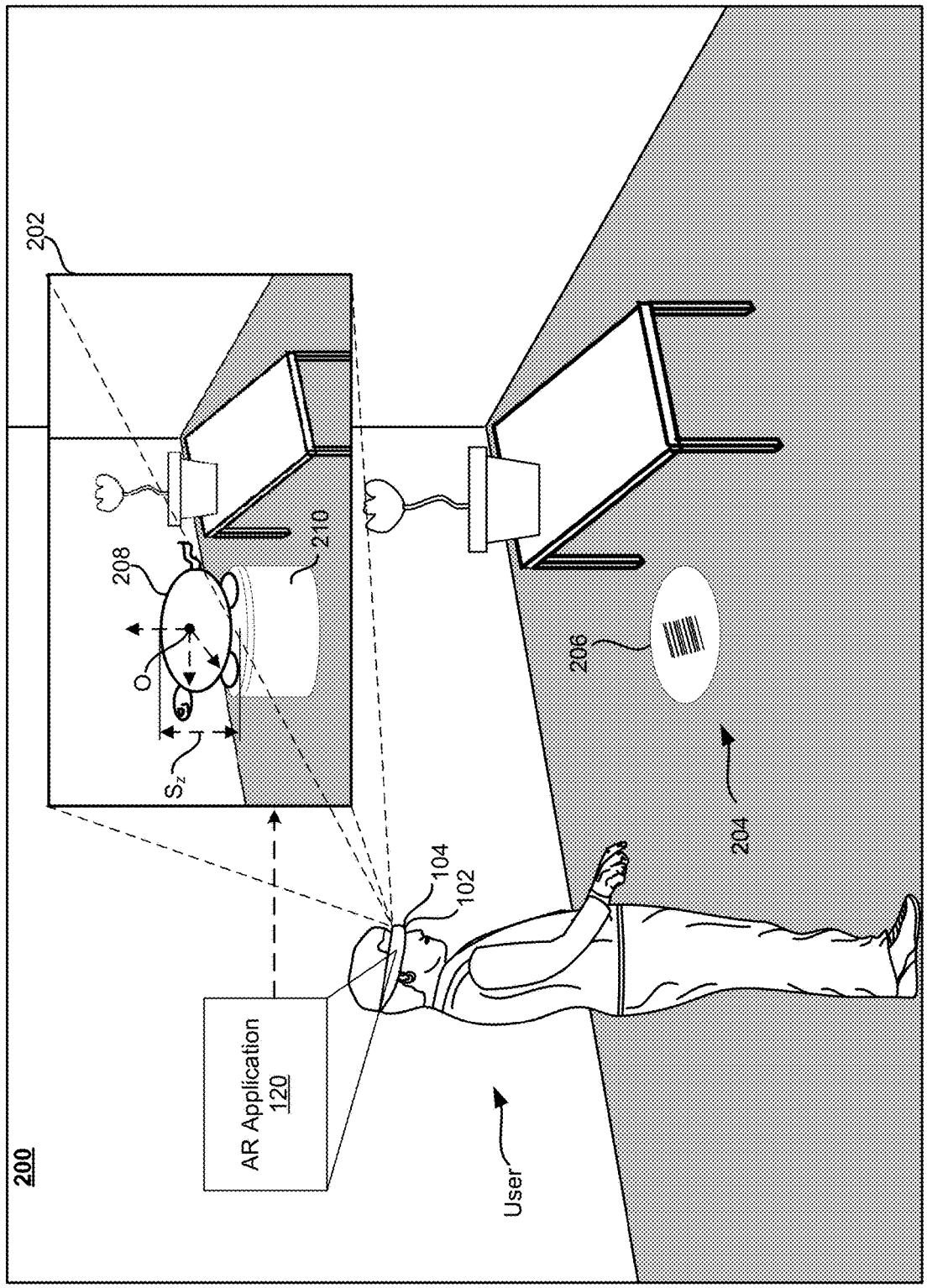
FIG. 2 is a third person view of an example physical space, in which a user is experiencing an AR environment through the example HMD of FIG. 1.

FIG. 2 is a third person view of an example physical space 200, in which a user is experiencing an AR environment 202 through the example HMD 104. The AR environment 202 is generated by the AR application 120 of the computing device 102 and displayed to the user through the HMD 104.

The physical space 200 includes a physical location 204 that is identified by a marker 206. In this example, the marker 206 includes a barcode disposed on a circular object. The location engine 126 may identify the middle of the circular object to identify a physical location, and the AR application 120 may retrieve a display management entity based on the barcode from the display management entities 128. In some implementations, the marker 206 may include a QR code, an image, or a sticker. In some implementations, physical locations are identified using stickers in combination with the surface upon which the sticker is placed. For example, identical stickers may be used to identify multiple physical locations. In such an example, the location engine 126 may distinguish the multiple physical locations from one another based on the visual features of the image behind the sticker (e.g., a first physical location is associated with a first sticker on a desktop with a woodgrain surface, a second physical location is associated with a second sticker that is identical to the first sticker but is on a tile floor, etc.).

In some implementations, multiple stickers are associated with a single physical location. The stickers may be positioned to define, at least in part, a size of a region in which content may be displayed. The relative locations of the stickers can be used to determine a size parameter and/or orientation parameter that is stored with the display management entity associated with the physical location 204.

The identified physical location 204 and associated display management entity are then used to generate the AR environment 202. For example, the marker 206 may have been placed in the physical space 200 by a teacher or guide. Additionally, the teacher or guide may associate the marker 206 with the physical location 204 and a display management entity while setting up a tour or virtual field trip. Although this example includes a marker 206, some implementations identify the physical location 204 without a marker (e.g., based on the position and/or orientation of the computing device 102 as determined using a global positioning system (GPS), visual positioning system, other location determining technology, and/or sensors of the IMU).

The AR environment 202 includes inserted content 208 and an inserted visual entity 210 that is displayed over an image of the physical space 200. In this example, the content 208 is a turtle and the visual entity 210 is a stage that is positioned beneath the content 208. The visual entity 210 may be associated with the display management entity associated with the physical location 204. Some implementations do not include a visual entity 210 or include a visual entity with different properties. For example, some implementations include a visual entity 210 that is flat (rather than raised as shown in FIG. 2). In some implementations, the visual entity is at least partially transparent.

Also shown in FIG. 2 are a size parameter Sz and an orientation parameter O of a display management entity. The size parameter Sz and the orientation parameter O are used to adjust the content 208 for display in the AR environment 202. The size parameter Sz defines a desired size of the content 208 in the Z dimension (i.e., the vertical dimension in this example). Some implementation may define a desired size in terms of other dimensions or in terms of multiple dimensions or may define target (or maximum) sizes in all three dimensions. The orientation parameter O may define an orientation in terms of one or more dimensions. The size parameter Sz and orientation parameter O are shown for illustrative purposes in FIG. 2. In at least some implementations, the size parameter Sz and orientation parameter O are not actually shown in the AR environment 202. In some implementations, one or more of the parameters may be shown in the AR environment 202 during a setup mode or on a user interface for adjusting parameters. The parameters may be adjusted before content is shown or while content is being shown (e.g., in response to inputs/commands from a teacher or guide user). In response to the adjustments to the parameters, the display of the content and/or the visual entity may be adjusted.

In some implementations, if a size parameter defines target sizes in multiple dimensions, a uniform scaling factor may be determined for the inserted content so that after orientation, the inserted content is scaled to the largest size that fits the size parameters for each of the dimensions. For example, scaling factors may be determined in the X-dimension, the Y-dimension, and the Z-dimension for the inserted content 208. The inserted content 208 may then be scaled by the smallest of the three determined scaling factors so that the inserted content 208 fits within the target sizes in all three dimensions.

In some implementations, the inserted content 208 may be scaled based on a scaling factor determined for content that has previously been displayed/inserted. For example, if the inserted content 208 is part of a sequence of content, the inserted content may be scaled according to a scaling factor determined for the first item of content in the sequence. In this manner, the relative scale of the various items of content can be conveyed to viewing users. For example, a sequence may allow viewing users to explore the solar system. The first item of content in the sequence may correspond to the planet earth, which may be displayed first. A scaling factor for the earth content may be determined from the size parameters associated with a display management entity. Then, the content for the other planets in the solar system may also be scaled according to the same scaling factor determined for the earth content. In this manner, the content for the other planets will be inserted/display in manner that will help convey the relative sizes of the planets.

In some implementations, the AR environment 202 is provided to the user as a single image or a pair of stereoscopic images that occupy substantially all of the user's field of view and are displayed to the user via the HMD 104. In other implementations, the AR environment is provided to the user by displaying/projecting the inserted content 208 on an at least partly transparent combiner that occupies at least a portion of the user's field of view. For example, portions of the HMD 104 may be transparent, and the user may be able to see the physical space 200 through those portions while the HMD 104 is being worn.

FIGS. 3A and 3B are perspective views of an example HMD 300, such as, for example, the HMD 104 worn by the user in FIG. 2, and FIG. 3C illustrates an example handheld electronic device 302 for controlling and/or interacting with the HMD 300.

The handheld electronic device 302 may include a housing 303 in which internal components of the device 302 are received, and a user interface 304 on an outside of the housing 303, accessible to the user. The user interface 304 may include a touch sensitive surface 306 configured to receive user touch inputs. The user interface 304 may also include other components for manipulation by the user such as, for example, actuation buttons, knobs, joysticks and the like. In some implementations, at least a portion of the user interface 304 may be configured as a touchscreen, with that portion of the user interface 304 being configured to display user interface items to the user, and also to receive touch inputs from the user on the touch sensitive surface 306. The handheld electronic device 302 may also include a light source 308 configured to selectively emit light, for example, a beam or ray, through a port in the housing 303, for example, in response to a user input received at the user interface 304.

The HMD 300 may include a housing 310 coupled to a frame 320, with an audio output device 330 including, for example, speakers mounted in headphones, also being coupled to the frame 320. In FIG. 3B, a front portion 310a of the housing 310 is rotated away from a base portion 310b of the housing 310 so that some of the components received in the housing 310 are visible. A display 340 may be mounted on an interior facing side of the front portion 310a of the housing 310. Lenses 350 may be mounted in the housing 310, between the user's eyes and the display 340 when the front portion 310a is in the closed position against the base portion 310b of the housing 310. In some implementations, the HMD 300 may include a sensing system 360 including various sensors and a control system 370 including a processor 390 and various control system devices to facilitate operation of the HMD 300.

In some implementations, the HMD 300 may include a camera 380 to capture still and moving images. The images captured by the camera 380 may be used to help track a physical position of the user and/or the handheld electronic device 302 in the real world, or physical space relative to the augmented environment, and/or may be displayed to the user on the display 340 in a pass through mode, allowing the user to temporarily leave the augmented environment and return to the physical environment without removing the HMD 300 or otherwise changing the configuration of the HMD 300 to move the housing 310 out of the line of sight of the user.

For example, in some implementations, the sensing system 360 may include an inertial measurement unit (IMU) 362 including various different types of sensors such as, for example, an accelerometer, a gyroscope, a magnetometer, and other such sensors. A position and orientation of the HMD 300 may be detected and tracked based on data provided by the sensors included in the IMU 362. The detected position and orientation of the HMD 300 may allow the system to detect and track the user's head gaze direction and movement.

In some implementations, the HMD 300 may include a gaze tracking device 265 to detect and track an eye gaze of the user. The gaze tracking device 365 may include, for example, an image sensor 365A, or multiple image sensors 365A, to capture images of the user's eyes, for example, a particular portion of the user's eyes, such as, for example, the pupil, to detect, and track direction and movement of, the user's gaze. In some implementations, the HMD 300 may be configured so that the detected gaze is processed as a user input to be translated into a corresponding interaction in the immersive virtual experience.

In some implementations, the HMD 300 includes a portable electronic device, such as a smartphone, that is removably disposed within a chamber of the housing 310. For example, the display 340 and the camera 380 may be provided by the portable electronic device. When the chamber is closed (as shown in FIG. 3A), the display 340 is aligned with the lenses 350 so that a user can view at least a portion of the display 340 (provided by the portable electronic device) through each eye. The camera 380 may align with an aperture in the housing 310 so that the portable electronic device of the HMD 300 can capture images while disposed in the housing 310.

Figure 4:
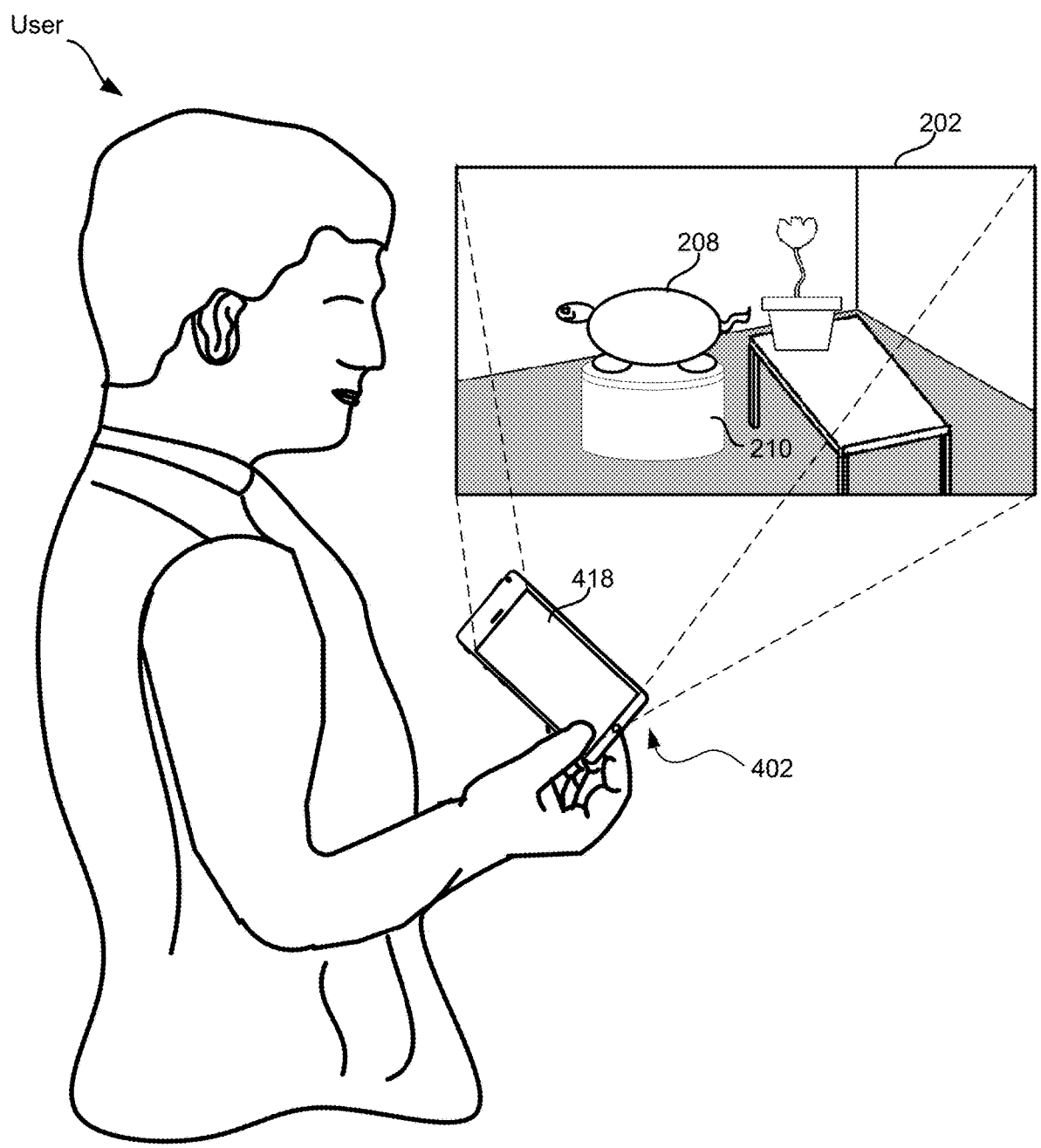
FIG. 4 is a schematic view of a user experiencing the AR environment via an example portable electronic device.

FIG. 4 is a schematic view of a user experiencing the AR environment 202 via an example portable electronic device 402. The portable electronic device 402 is an example of the computing device 102. The portable electronic device 402 may be a smartphone, a tablet, or another type of portable computing device. In this example, the user is experiencing the AR environment through a display device 418 of the portable electronic device 402. For example, the display device 418 may include a screen that can show images and/or videos.

Figure 5:
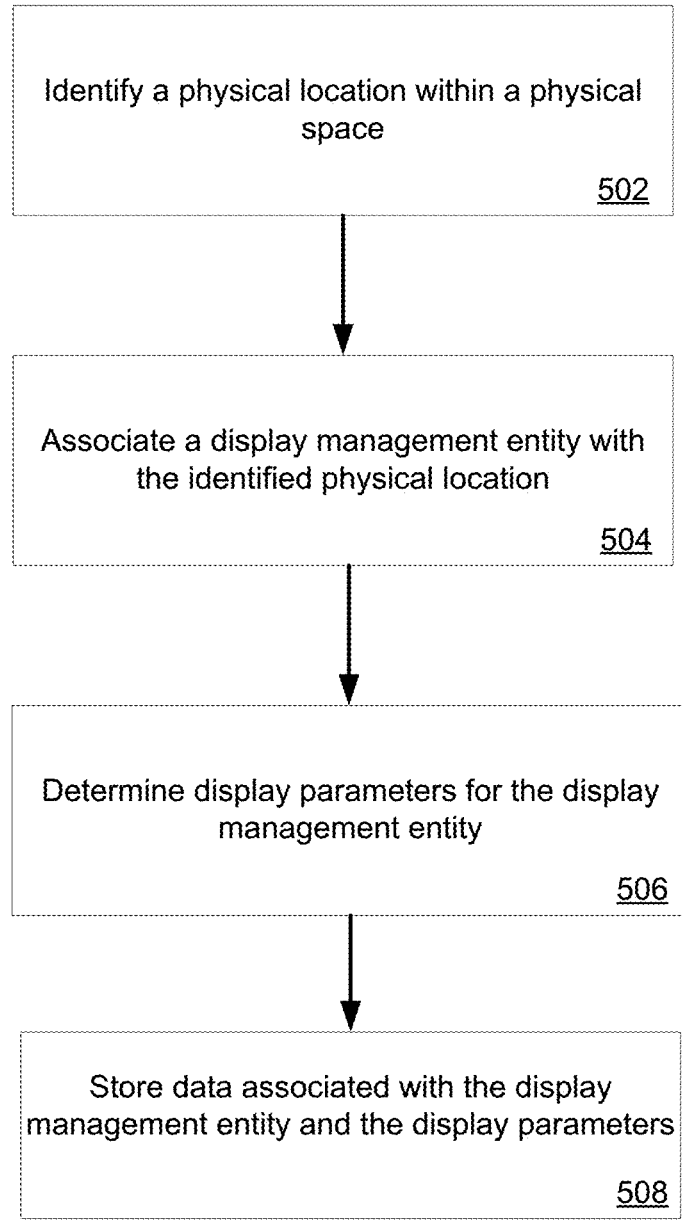
FIG. 5 is a diagram of an example method of setting up a physical location for displaying content, in accordance with implementations described herein.

FIG. 5 is a diagram of an example method 500 of setting up a physical location for displaying content, in accordance with implementations described herein. This method 500 may, for example, be performed by the computing device 102 to provide a virtual field trip or tour experience using an AR environment for a user. This method may be performed by a teacher, guide, or another user working as a tour maker prior to users experiencing the AR environment.

At operation 502, a physical location within a physical space is identified. For example, the physical location may be identified within an image of the physical space. The image may be captured with a camera assembly, such as the camera assembly 132. In some implementations, a previously captured image that is stored in a memory location may be retrieved. An image may also be received from another computing device, such as a server that is accessible via a network. In some implementations, the image includes one or more physical markers that were disposed in the physical space prior to image capture. Image processing techniques may be used to identify the location of the markers within the space and, therefore, identify a physical location within the space. The user may also identify the physical location within the image (e.g., by touching/pointing to a location on a display device showing the image).

At operation 504, a display management entity is associated with the identified physical location. At operation 506, display parameters for the display management entity are determined. In some implementations, a user enters one or more of a size parameter, an orientation parameter, and an offset parameter for the display management entity. Additionally, in some implementations, default parameters are suggested based on application defaults, user defaults, or location defaults.

For example, a specific AR application may provide a default size for displayed content. Additionally, a user setting up a tour may have defined a default size for displayed content. As another example, the physical space within which the physical location is disposed may define a default size for displayed content. In some implementations, the default size is determined based on the size parameter of the most recently generated display management entity in the physical space and/or near the identified physical location. The default size can also be determined based on properties of the physical space (e.g., such as the size or available volume within a plane at/around the physical location) or the number of viewers participating (e.g., the size parameter may default to a larger value when more users are connected and will need to be able to view the content). Orientation, offset, and other display parameters may be determined in a similar manner. In some implementations, parameters may be determined in whole or in part based on data captured from sensors on computing device. For example, geolocation data from a location sensor may indicate that a physical location is within a school, which may be used to infer the age or likely number of users. This information may then be used to determine appropriate offset or other parameters (e.g., a lower offset may be used for elementary school students than for high school students). As another example, an image or video captured from a camera may be used to recognize the number of viewers, height of viewers, or estimated age of viewers surrounding a physical location. In some implementations, audio volume parameters may be determined based on estimate the spatial volume around the physical location, the number of users, and/or measuring background noise.

In some implementations, a user interface may display indicators of the display parameters overlaid on an image of the physical space to help the user visualize how the content will fit in the physical space. For example, indicators such as those shown in FIG. 2 with respect to the size parameter Sz, and orientation parameter O may be shown. In some implementations, parameters for displaying a visual entity in association with the physical location are determined. The parameters can include a style, a selection of a geometric model (e.g., stage, desk, table, shelf models upon which content may be displayed) and/or size parameters, for example. In some implementation, the visual entity may be displayed overlaid on an image of the physical space too.

At operation 508, data associated with the display management entity and the display parameters are stored. For example, a record may be generated in a display management entity table. The record may include a field that associates the display management entity with the identified physical location.

Figure 6:
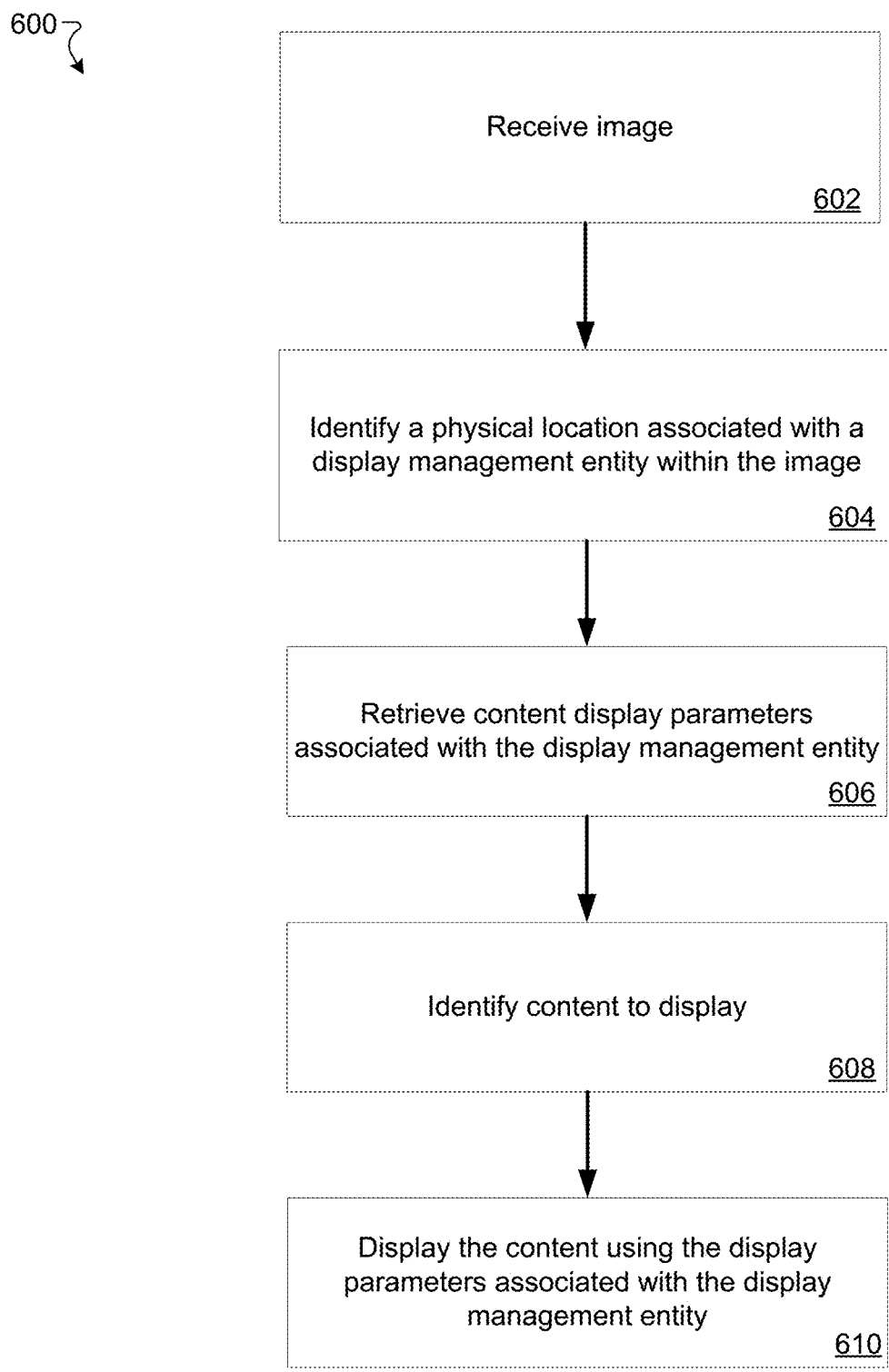
FIG. 6 is a diagram of an example method of inserting content, in accordance with implementations described herein.

FIG. 6 is a diagram of an example method 600 of inserting content, in accordance with implementations described herein. This method 600 may, for example, be performed by the computing device 102 to provide an AR environment for a user. The method 600 may be used to experience a virtual field trip or tour that has been configured for a physical space.

Figure 7A:
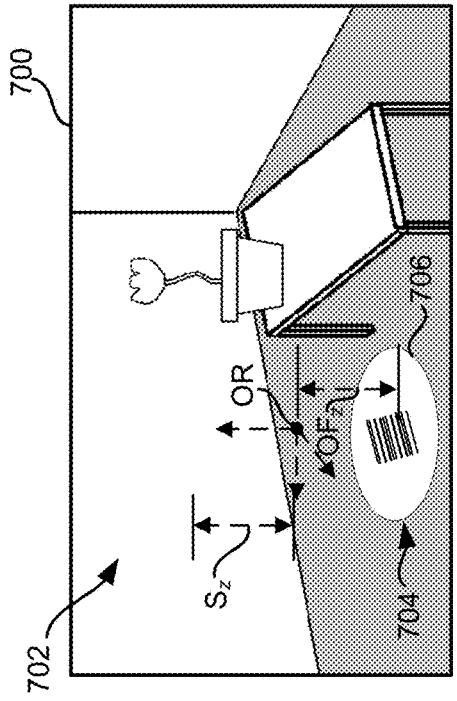
FIGS. 7A-7H are schematic diagrams of steps of inserting and displaying content in accordance with implementations as described herein.

At operation 602, an image is received. For example, the image may be captured by a camera assembly of a computing device, such as the computing device 102. The captured image may be stored as a texture in the image buffer 124. The image may also be received from a storage location such as a computer-readable memory device or from another computing device via a network. An example image 700 of a physical space 702 is shown in FIG. 7A.

At operation 604, a physical location associated with a display management entity is identified within the image. As described previously, the physical location may be identified based on a marker or based on a physical coordinate determined with respect to the location of the computing device 102. Based on the identified physical location, a display management entity associated with the location can also be identified. The display management entity may be identified based on a physical coordinate and/or data retrieved from the marker (e.g., an identifier encoded in a barcode or QR code). In FIG. 7A, the example physical space 702 shown in the example image 700 includes a physical location 704 that is indicated by a marker 706.

Figure 7B:
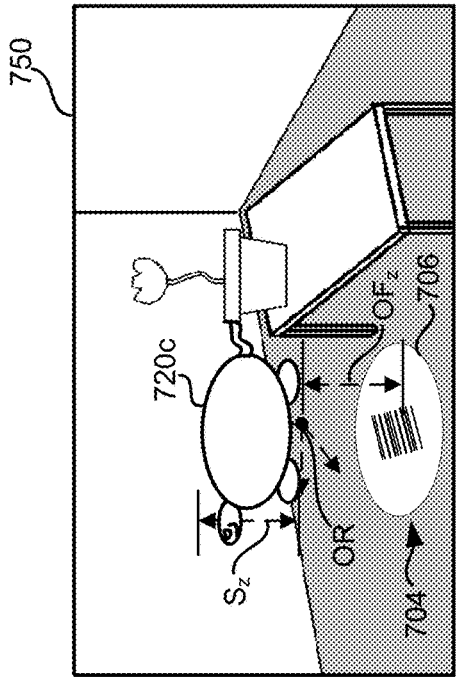

At operation 606, content display parameters associated with the display management entity are retrieved. The content display parameters alter how content is display at the physical location associated with the display management entity. For example, the content display parameters can include, but are not limited to, size, orientation, and offset parameters. The content display parameters may also include lighting parameters that alter how content is shaded and other parameters. FIG. 7B includes an example representation of a size parameter Sz, an orientation parameter OR, and an offset parameter OFz. The size parameter Sz defines a desired size of the content in the Z-dimension (i.e., the vertical dimension in this example). In some implementations, the size parameter is defined in a different dimension or in multiple dimensions. The size parameter may also be dimensionless (e.g., the parameter may define a maximum or minimum length in any dimension). The orientation parameter OR defines an orientation of the content. In this example, the orientation parameter OR defines a three-axis coordinate system, allowing the content to be aligned in three dimensions. Some implementations may include an orientation parameter that is defined in terms of a single dimension (e.g., a front facing direction or an upward direction). The offset parameter OFz defines an offset in the Z-dimension (i.e., the vertical dimension here). In this example, the offset parameter OFz positions the content above the marker, which is positioned on the ground. In some implementations, the offset parameter may offset the content in multiple dimensions (e.g., the offset parameter may include a vertical and lateral offset).

Figure 7C:
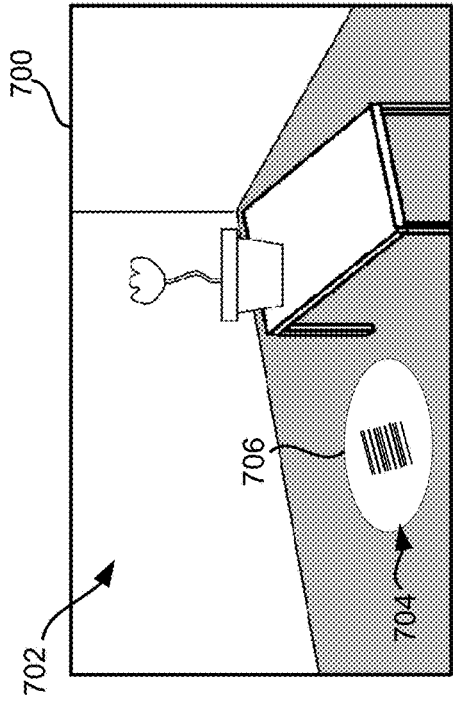

At operation 608, content to display is identified. The content may be identified based on a predefined virtual tour of field trip. For example, the virtual tour or field trip may define a sequence of content to display. Initially, the first content from the sequence is identified for display. Thereafter, the content identified for display may be updated to the next content in the sequence in response to a user input (e.g., from a teacher or guide) or based on a predetermined time period elapsing. FIG. 7C shows an example of content 720*a* that has been identified for display in the AR environment.

Figure 7D:
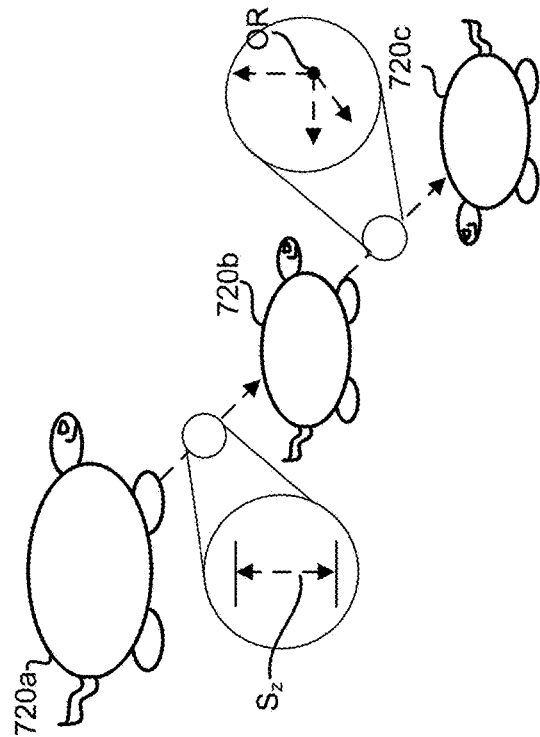

At operation 610, the content is displayed using the display parameters associated with the display management entity. In some implementations, the content is adjusted based on the display parameters before being displayed. FIG. 7C shows an example of the content 720*a* after adjustment based on the size parameter (at 720*b*) and after adjustment based on the orientation parameter OR (at 720*c*). FIG. 7D shows an augmented image 750 with the adjusted content 720*c* displayed at the location 704 as offset by the offset parameter OFz. Although illustrations of the display parameters, Sz, OR, and OFz, are shown in FIG. 7D, these display parameters are not typically displayed in an augmented environment (except, in some implementations of a tour/field trip creation mode). The augmented image may then be displayed to the user to provide an augmented environment. Additionally, the content 720*a* may be projected onto a transparent combiner surface where it will be shown over a user's field of view of the physical space.

Figure 7E:
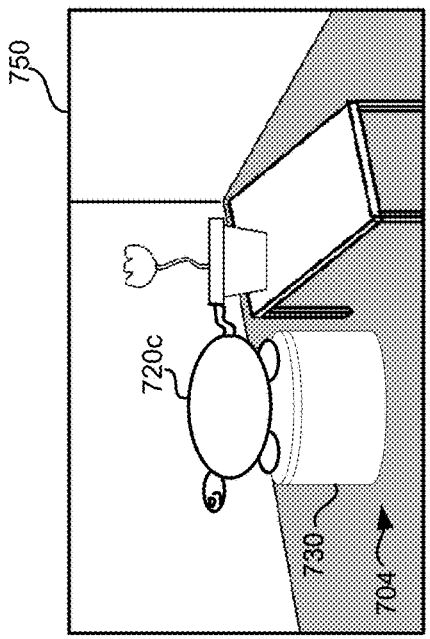

In some implementations, a visual entity associated with the display management entity is also added to the augmented image. An example of the visual entity is a stage-like entity that includes a surface beneath the inserted content. The visual entity may provide a surface for the content to appear to sit on. The surface of the visual entity may also provide a surface for the content to cast a shadow on. In some implementations, the visual entity may be added to the AR environment before content is added. In this manner, the visual entity may attract a user's attention to a physical location in the physical space before the content is added. An example visual entity 730 is shown in FIG. 7E.

Figure 7F:
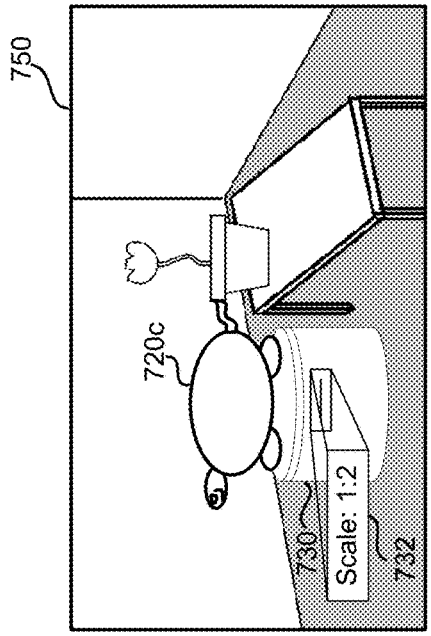

Additionally, the visual entity may include a scale indicator to indicate the scale of the content displayed at the associated physical location in the augmented environment. The scale indicator may be a textual entry that is overlaid on a portion of the visual entity. FIG. 7F shows an example scale indictor 732 shown on the side of the visual entity 730. In this example, the scale indicator 732 reads "Scale: 1:2", indicating that the content 720*c* is being shown at a 1:2 scale.

Figure 7G:
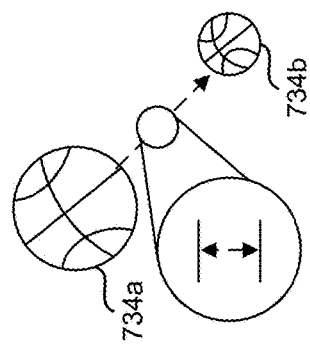
Figure 7H:
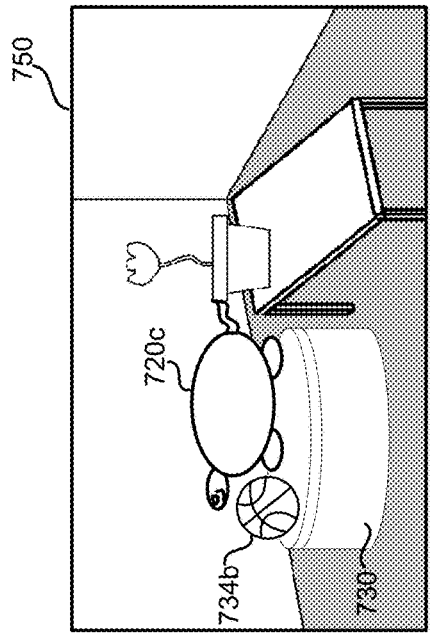

In some implementations, the scale indicator may include an additional object that has been scaled similarly. In some implementations, the additional object is an object that is likely to be familiar to users so that the users can understand the scale of the added content by comparison to the additional object. For example, the additional object could be a strand of hair, a basketball, a school desk, or a school bus. FIG. 7G shows an example of an additional object 734*a* that has been scaled to the scale indicator 734*b*. FIG. 7H shows the scale indicator 734*b* displayed next to the content 720*c* on the visual entity 730 in the augmented image 750.

Figure 8:
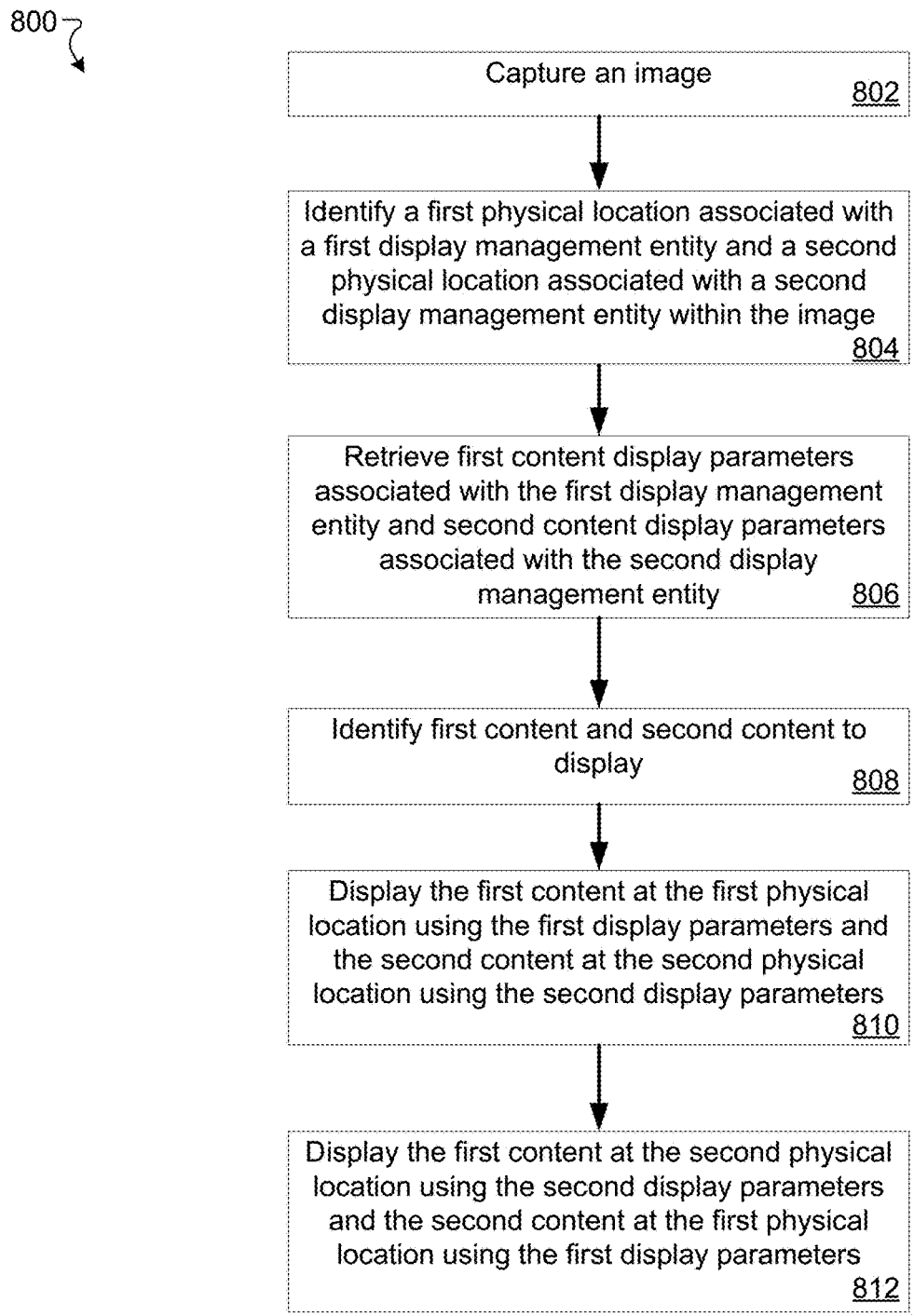
FIG. 8 is a diagram of an example method of inserting content, in accordance with implementations described herein.

FIG. 8 is a diagram of an example method 800 of inserting content, in accordance with implementations described herein. This method 800 may, for example, be performed by the computing device 102 to provide an AR environment for a user. The method 800 may be used to experience a virtual field trip or tour that has been configured for a physical space that includes multiple physical locations for displaying content.

Figure 9B:
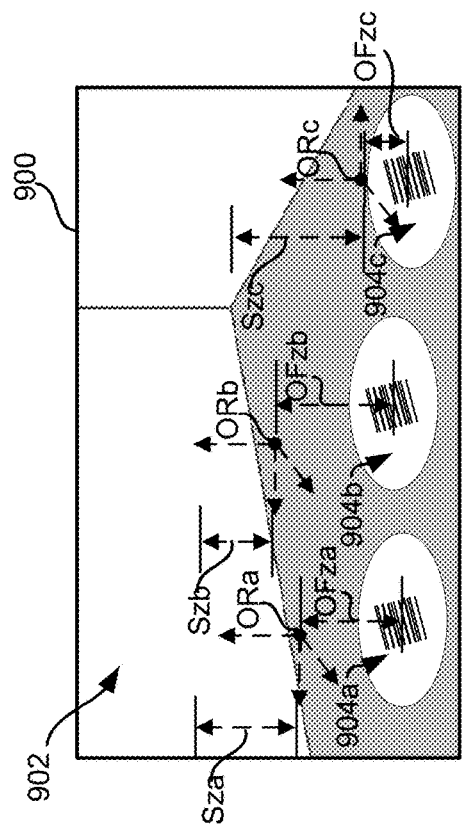
FIGS. 9A-9D are schematic diagrams of steps of inserting and displaying content in accordance with implementations as described herein.

At operation 802, an image of a physical space is captured. For example, the image may be captured by a camera assembly of a computing device, such as the computing device 102. The captured image may be stored as a texture in the image buffer 124. An example image 900 of a physical space 902 is shown in FIG. 9A.

At operation 804, a first physical location associated with a first display management entity and a second physical location associated with a second display management entity are identified within the image. Although alternatives are possible, the first physical location and the second physical location may be identified based on the presence of markers within the captured image. FIG. 9A shows the physical space 902 with three physical locations 904*a*, 904*b*, and 904*c*, each indicated by a marker 906*a*, 906*b*, and 906*c* respectively.

At operation 806, first content display parameters associated with the first display management entity and second content display parameters associated with the second display management entity are retrieved. As described above, various display parameters such as a size parameter, an orientation parameter, and an offset parameter can be associated with a display management entity. FIG. 9B shows example size parameters Sza, Szb, and Szc, orientation parameters ORa, ORb, and ORc, and offset parameters OFza, OFzb, and OFzc for the display management entities associated with the physical locations 904*a*, 904*b*, and 904*c* respectively.

At operation 808, first content and second content to display are identified. As described previously, the content may be identified based on a predefined sequence of content that is part of a virtual field trip or tour. For example, the first content may be identified as the first item of content in the sequence and the second content may be identified as the second item of content in the sequence.

At operation 810, the first content is displayed at the first physical location using the first display parameters and the second content is displayed at the second physical location using the second display parameters. As described above, the identified content is then scaled, oriented, offset, and otherwise adjusted when it is displayed based on the display parameters from the display management entity associated with the corresponding physical location. FIG. 9C shows an example of content 920*a* being displayed at the physical location 904*a* based on the display parameters of the associated display management entity. Similarly, FIG. 9C shows an example of content 920*b* and 920*c* being displayed at the physical locations 904*b* and 904*c*, respectively, using the display parameters of the associated display management entities. Also shown ii FIG. 9C are visual entities 930*a*, 930*b*, and 930*c*.

At operation 812, the first content is displayed at the second physical location using the second display parameters and the second content is displayed at the first physical location using the first display parameters. In this manner, the content displayed is swapped. In examples with more than two physical locations for displaying content, the content may cycle through the locations. The content may switch in response to an event such as a user input from a viewer or a guide/teacher, or a time period elapsing. When the content switches, the content currently being displayed at a current location may stop displaying and new content may be displayed. In some implementations, a transition between the content currently being displayed and new content is shown. For example, the current content may fade out and the new content may fade in. Some implementations include various animations to illustrate the transition from one content to the next (e.g., content may slide out/in from a side, etc.). The transition may also include scaling down the current content and scaling up the new content. Some implementations, transition content by identifying one or more surface planes of the current content and morphing those surface planes to the positions and/or proportions of surface planes of the new content.

Figure 9D:
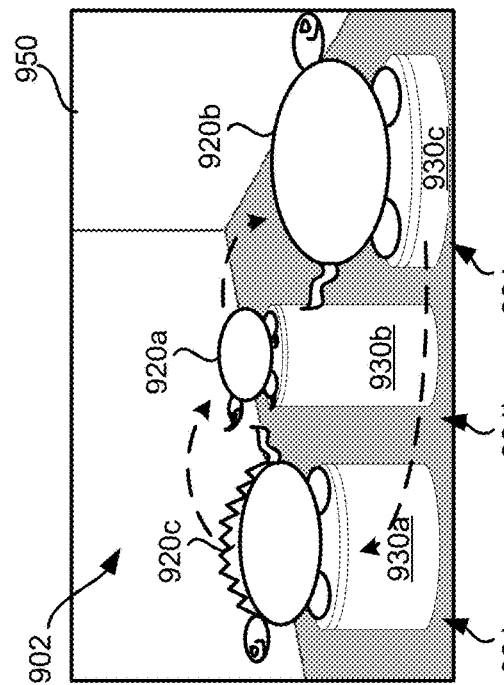
Figure 9A:
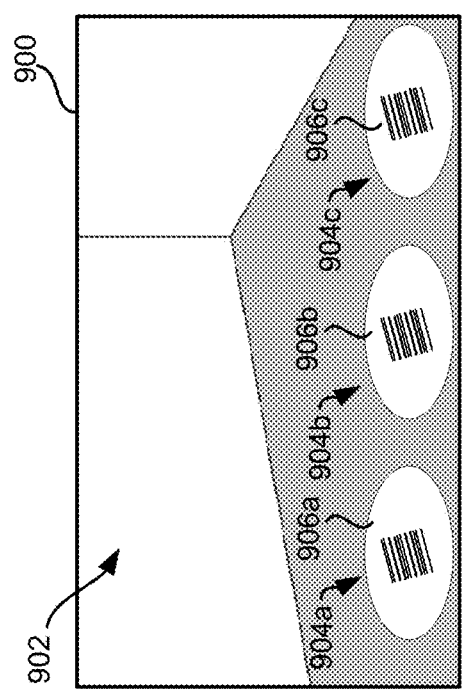
Figure 9C:
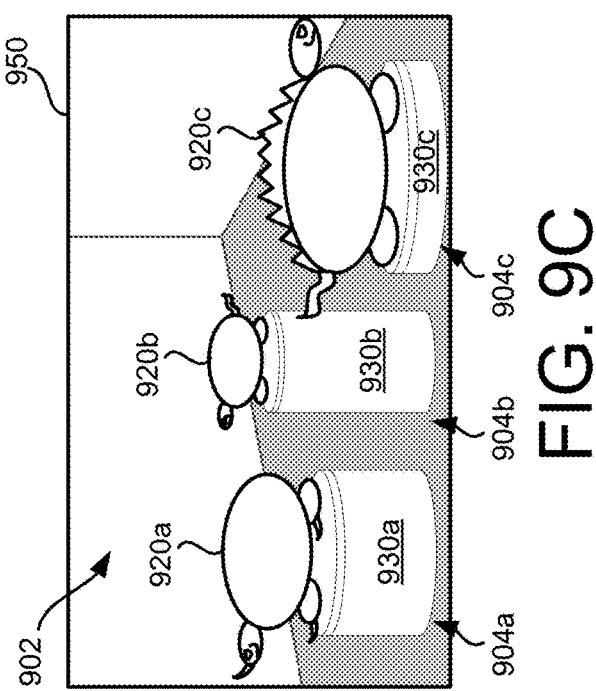

FIG. 9D shows an example where the content has cycled with respect to FIG. 9C. In FIG. 9D, the content 920a is displayed at the physical location 904b using the display parameters of the display management entity associated with the physical location 904b, the content 920b is displayed at the physical location 904c using the display parameters of the display management entity associated with the physical location 904c, and the content 920c is displayed at the physical location 904a using the display parameters of the display management entity associated with the physical location 904a.

In some implementations, the same content is shown at more than one of the physical locations. The multiple physical locations may allow more users to view the content than would be possible at a single location. Additionally, in some implementations, a user (e.g., a teacher or guide) may be able to control or adjust the display of content in multiple physical locations. For example, the user may provide a user input to transform content (e.g., scale, rotate) and, in response, content displayed at multiple physical locations may be transformed simultaneously. For example, the transformation may be applied to the display management entities (or the properties associated therewith) of each of the physical locations. The transformation may be a relative factor (e.g., scale by 150%) or an absolute factor (e.g., scale to 10 feet in the Z dimension). In some implementations, a single display management entity may be associated with multiple physical locations so that display properties for these multiple physical locations will be the same.

Figure 10:
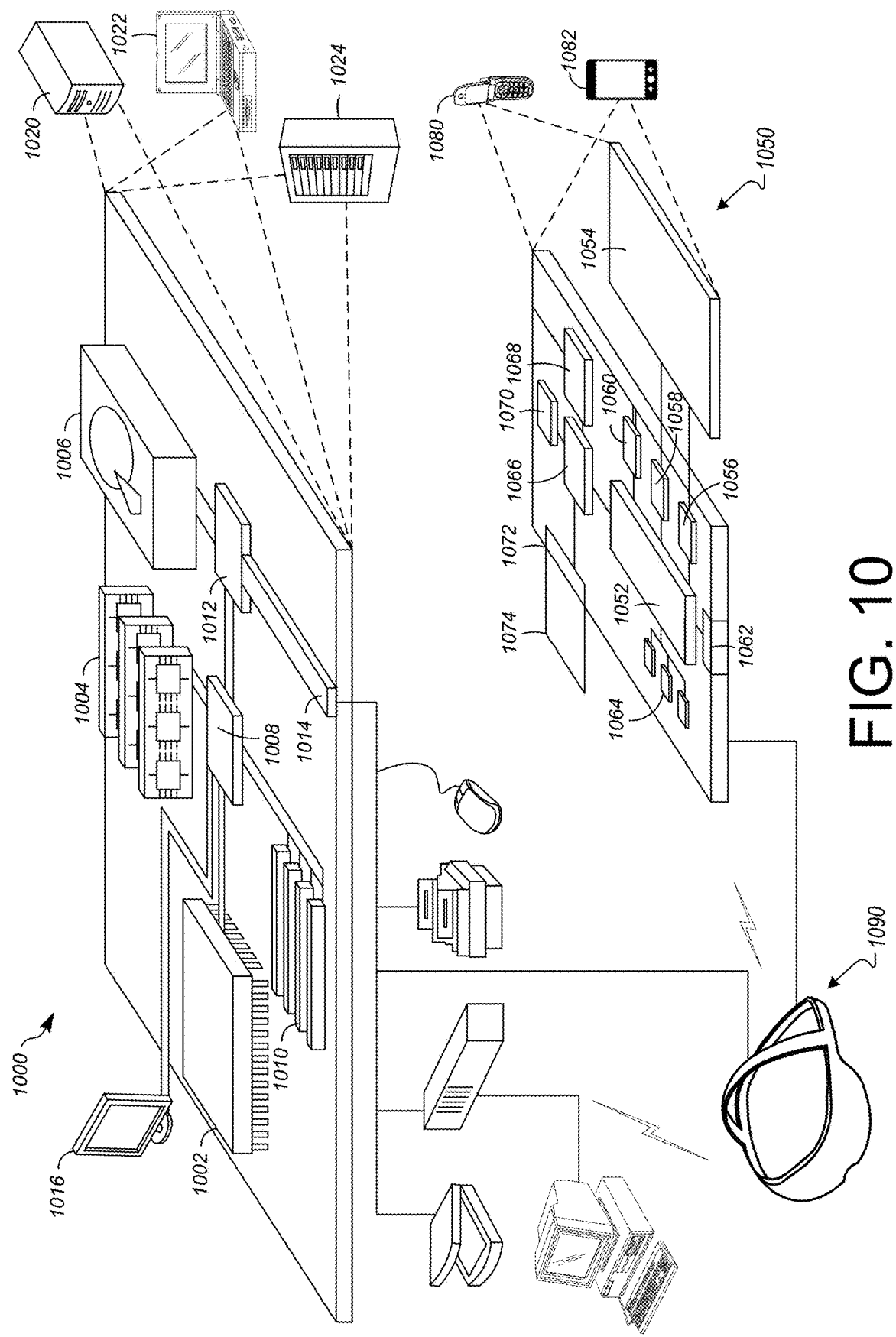
FIG. 10 shows an example of a computer device and a mobile computer device that can be used to implement the techniques described herein.

FIG. 10 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may include appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In-Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 9 can include sensors that interface with an AR headset/HMD device 1090 to generate an augmented environment for viewing inserted content within the physical space. For example, one or more sensors included on a computing device 1050 or other computing device depicted in FIG. 9, can provide input to the AR headset 1090 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the AR space that can then be used as input to the AR space. For example, the computing device 1050 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the AR space can cause a particular action to occur in the AR space.

In some implementations, a touchscreen of the computing device 1050 can be rendered as a touchpad in AR space. A user can interact with the touchscreen of the computing device 1050. The interactions are rendered, in AR headset 1090 for example, as movements on the rendered touchpad in the AR space. The rendered movements can control virtual objects in the AR space.

In some implementations, one or more output devices included on the computing device 1050 can provide output and/or feedback to a user of the AR headset 1090 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the AR space. The actions could alter the display of content for a single user or for multiple users (e.g., a teacher or guide's actions may alter the display of content for all users participating in the virtual tour or field trip). In the example of the laser pointer in a AR space, the computing device 1050 appears as a virtual laser pointer in the computer-generated, 3D environment. As the user manipulates the computing device 1050, the user in the AR space sees movement of the laser pointer. The user receives feedback from interactions with the computing device 1050 in the AR environment on the computing device 1050 or on the AR headset 1090.

In some implementations, a computing device 1050 may include a touchscreen. For example, a user can interact with the touchscreen to interact with the AR environment. For example, the touchscreen may include user interface elements such as sliders that can control properties of the AR environment, such as the display properties associated with a display management entity. The user interface elements may also allow a user to switch how content is scaled (e.g., switching from scaling based on a relative scale to a real-world scale). Some implementations also respond to 2D touch screen gestures such as pinches or swipes to change the content (e.g., to scale, rotate, or switch content or display properties). For example, a user can interact with the touchscreen in a particular manner that can mimic what happens on the touchscreen with what happens in the AR space. For example, a user may use a pinching-type motion to zoom/scale content displayed on the touchscreen. This pinching-type motion on the touchscreen can cause information provided in the AR space to be zoomed/scaled. Additionally, in some implementations, the computing device 1050 may support 3D gestures in the physical world. For example, reaching the computing device 1050 out into a spatial volume defined by the size parameters of a display management entity may be interpreted as a particular input by the computing device 1050. Actuating a physical button, touchscreen virtual button, or other user actuatable input (e.g., a squeeze or shake motion) of the computing device may be recognized as another input by the computing device 1050. Some implementations treat combinations of these actions as gestures that correspond to commands within the AR environment. For example, some implementations may scale content in response to a user reaching out the computing device into a defined spatial volume, squeezing the computing device, and pulling the computing device back. As another example, a casting motion while holding the computing device 1050 may be recognized as a command to grab an item.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR space to control objects in the AR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In the following some examples are given.

Example 1: A method comprising: associating a display management entity with a physical location in a physical space; determining a display parameter for the display management entity; and storing the display parameter.

Example 2: The method of example 1, wherein the physical location is identified within the physical space using a physical entity.

Example 3: The method of example 2, wherein the physical entity is a visual marker.

Example 4: The method of example 3, wherein the visual marker includes a QR code.

Example 5: The method of example 3, wherein the visual marker includes a picture.

Example 6: The method of example 3, wherein the visual marker includes a sticker.

Example 7: The method of example 6, wherein the visual marker further includes a surface underlying the sticker.

Example 8: The method of example 2, wherein determining the location in the physical space associated with the display management entity comprises: determining a location of a computing device; capturing an image of the physical entity with the computing device; determining the location of the physical entity based on the location of the computing device and the image of the physical entity; and associating a location in the physical space with the display management entity based on the determined location of the physical entity.

Example 9: The method of example 1, wherein the physical location is associated with a location coordinate within the physical space.

Example 10: The method of example 1, wherein the display parameter includes a size parameter and the determining a display parameter for the display management entity includes: identifying an available volume of space at the physical location; and determining the size parameter based on the available volume of space.

Example 11: The method of example 1, wherein the display parameter includes a size parameter and the determining a display parameter for the display management entity includes: determining a number of users expected to simultaneously view content displayed at the physical location; and determining the size parameter based on the number of users.

Example 12: The method of example 1, further comprising: generating a user interface to control the display parameter for the display management entity, the user interface including a visual representation of the display parameter; and displaying the user interface overlaid on an image of the physical space.

Example 13: The method of example 12, further comprising: receiving a user input to adjust the display parameter; updating the visual representation of the display parameter based on the user input; and displaying the user interface including the updated visual representation overlaid on an image of the physical space.

Example 14: The method of example 1, wherein the display parameter includes a size parameter and the determining a display parameter for the display management entity comprises determining the size parameter based on an available spatial volume at the physical location.

Example 15: The method of example 1, further comprising: identifying first augmented reality content to be displayed in association with the display management entity; and displaying the first augmented reality content at the physical location using the display parameters associated with the display management entity.

Example 16: The method of example 15, wherein the display parameter includes a size parameter and the displaying the first augmented reality content includes scaling the first augmented reality content based on the size parameter.

Example 17: The method of example 15, wherein the display parameter includes an orientation parameter and wherein the displaying the first augmented reality content includes orienting the first augmented reality content based on the orientation parameter.

Example 18: The method of example 15, wherein the display parameter includes an offset parameter and wherein the displaying the first augmented reality content includes positioning the first augmented reality content based on the offset parameter.

Example 19: The method of example 18, wherein the offset parameter includes a vertical offset.

Example 20: The method of example 18, wherein the offset parameter includes a lateral offset.

Example 21: The method of example 18, wherein the offset parameter includes a lateral offset and a vertical offset.

Example 22: The method of example 15, wherein the display parameter includes a lighting parameter and wherein the displaying the first augmented reality content includes shading the first augmented reality content based on the lighting parameter.

Example 23: The method of example 15, further comprising: identifying second augmented reality content to be displayed in association with the display management entity; and after displaying the first augmented reality content, switching to displaying the second augmented reality content at the physical location using the display parameters associated with the display management entity.

Example 24: The method of example 23, wherein the switching to displaying the second augmented reality content includes: stopping display of the first augmented reality content; and displaying the second augmented reality content.

Example 25: The method of example 23, wherein the switching to displaying the second augmented reality content includes transitioning from display of the first augmented reality content to display of the second augmented reality content.

Example 26: The method of example 25, wherein the transitioning from display of the first augmented reality content to display of the second augmented reality content includes: fading out the first augmented reality content; and while the first augmented reality content is fading out, fading in the second augmented reality content.

Example 27: The method of example 26, wherein the transitioning from display of the first augmented reality content to display of the second augmented reality content includes: displaying the first augmented reality content moving away from the physical location; and displaying the second augmented reality content moving toward the physical location.

Example 28: The method of example 26, wherein the transitioning from display of the first augmented reality content to display of the second augmented reality content includes: displaying the first augmented reality content being scaled down; and displaying the second augmented reality content being scaled up.

Example 29: The method of example 23, wherein the displaying the second augmented reality content at the physical location using the display parameters associated with the display management entity includes: determining a scaling factor for the second augmented reality content using the display parameters associated with the display management entity; and scaling the second augmented reality content based on the scaling factor determined for the second augmented reality content.

Example 30: The method of example 23, wherein the displaying the second augmented reality content at the physical location using the display parameters associated with the display management entity includes: scaling the second augmented reality content based on a scaling factor determined for the first augmented reality content using the display parameters associated with the display management entity.

Example 31: The method of example 23, further comprising displaying additional augmented reality content at the physical location using the display parameters associated with the display management entity, including scaling the additional augmented reality content based on a scaling factor determined for a previously displayed augmented reality content using the display parameters associated with the display management entity.

Example 32: The method of example 15, further comprising generating a visual representation of the display management entity based on the physical location.

Example 33: The method of example 32, wherein the visual representation includes a surface upon which augmented reality entities can be displayed.

Example 34: The method of example 33, wherein the surface is a horizontal plane.

Example 35: The method of example 32, wherein the visual representation includes a vertical surface.

Example 36: The method of example 15, further comprising displaying a visual scale entity that is scaled based on a scaling factor associated with displaying the first augmented reality content using the display parameters.

Example 37: A method comprising: associating a first display management entity with a first physical location in a physical space; storing first display parameters for the first display management entity; associating a second display management entity with a second physical location in the physical space; storing second display parameters for the second display management entity; displaying first augmented reality content at the first location using the first display parameters; and displaying second augmented reality content at the second location using the second display parameters.

Example 38: The method of example 37, wherein the first augmented reality content and the second augmented reality content are generated from a same content.

Example 39: The method of example 37, wherein the first augmented reality content and the second augmented reality content are generated from different content.

Example 40: The method of example 39, further comprising: receiving a user input; responsive to the user input: displaying the first augmented reality content at the second location using the second display parameters; and displaying third augmented reality content at the first location using the first display parameters.

Example 41: The method of example 37, further comprising: receiving a user input; responsive to the user input: applying a transformation to the first display parameters; and displaying the first augmented reality content at the first location using the transformed first display parameters.

Example 42: The method of example 41, further comprising: responsive to the user input: applying the transformation to the second display parameters; and displaying the second augmented reality content at the second location using the transformed second display parameters.

Example 43: A method comprising: associating a display management entity with a first physical location in a physical space; associating the display management entity with a second physical location in the physical space; storing display parameters for the display management entity; displaying first augmented reality content at the first location using the display parameters; and displaying second augmented reality content at the second location using the display parameters.

Example 44: A method comprising: receiving an image; identifying a physical location associated with a display management entity within the image; retrieving content display parameters associated with the display management entity; identifying content to display; and displaying the content using the display parameters associated with the display management entity.

What is claimed is:

1. A non-transitory computer-readable storage medium comprising instructions stored thereon that, when executed by at least one processor, are configured to cause a computing system to at least:
   receive an image;
   identify a physical location associated with a display management entity within the image using a marker;
   retrieve content display parameters associated with the display management entity;
   identify augmented reality content to display; and
   display the augmented reality content at the physical location associated with the marker and display a visual entity between the marker and the augmented reality content using the display parameters associated with the display management entity, wherein the visual entity includes a structure on which the augmented reality content is displayed and the visual entity includes a scale indicator that includes an additional object that is scaled in size similar to the augmented reality content and displayed with the augmented reality content.

2. The non-transitory computer-readable storage medium of claim 1, wherein the display parameters include a size parameter and the instructions that are configured to cause the computing system to display the augmented reality content include instructions that are configured to cause the computing system to scale the augmented reality content based on the size parameter.

3. The non-transitory computer-readable storage medium of claim 1, wherein the display parameters include an orientation parameter and the instructions that are configured to cause the computing system to display the augmented reality content include instructions that are configured to cause the computing system to orient the augmented reality content based on the orientation parameter.

4. The non-transitory computer-readable storage medium of claim 1, wherein the display parameters include an offset parameter and wherein the instructions that are configured to cause the computing system to display the augmented reality content include instructions that are configured to cause the computing system to position the augmented reality content based on the offset parameter.

5. The non-transitory computer-readable storage medium of claim 1, wherein the instructions stored thereon are further configured to cause the computing system to:
identify additional augmented reality content to be displayed in association with the display management entity; and
after displaying the augmented reality content, switch to displaying the additional augmented reality content at the physical location using the display parameters associated with the display management entity.

6. The non-transitory computer-readable storage medium of claim 5, wherein the instructions configured to cause the computing system to switch to displaying the additional augmented reality content at the physical location include instructions configured to cause the computing system to:
determine a scaling factor for the additional augmented reality content using the display parameters associated with the display management entity; and
scale the additional augmented reality content based on the scaling factor determined for the additional augmented reality content.

7. A method comprising:
associating a display management entity with a physical location in a physical space using a marker;
determining a display parameter for the display management entity;
storing the display parameter; and
determining augmented reality content to display at the physical location associated with the marker and determining a visual entity to display between the marker and the augmented reality content using the display parameter, wherein the visual entity includes a structure on which the augmented reality content is displayed and the visual entity includes a scale indicator that includes an additional object that is scaled in size similar to the augmented reality content and displayed with the augmented reality content.

8. The method of claim 7, wherein the physical location is identified within the physical space using a physical entity, wherein the physical entity is the marker.

9. The method of claim 8, wherein determining the location in the physical space associated with the display management entity comprises:
determining a location of a computing device;
capturing an image of the physical entity with the computing device;
determining the location of the physical entity based on the location of the computing device and the image of the physical entity; and
associating a location in the physical space with the display management entity based on the determined location of the physical entity.

10. The method of claim 7, wherein the physical location is associated with a location coordinate within the physical space.

11. The method of claim 7, wherein the display parameter includes a size parameter and the determining a display parameter for the display management entity includes:
identifying an available volume of space at the physical location; and
determining the size parameter based on the available volume of space.

12. The method of claim 7, wherein the display parameter includes a size parameter and the determining a display parameter for the display management entity includes:
determining a number of users expected to simultaneously view the augmented reality content displayed at the physical location; and
determining the size parameter based on the number of users.

13. The method of claim 7, further comprising:
generating a user interface to control the display parameter for the display management entity, the user interface including a visual representation of the display parameter; and
displaying the user interface overlaid on an image of the physical space.

14. The method of claim 13, further comprising:
receiving a user input to adjust the display parameter;
updating the visual representation of the display parameter based on the user input; and
displaying the user interface including the updated visual representation overlaid on an image of the physical space.

15. A system comprising:
at least one processor; and
memory storing instructions that, when executed by the at least one processor, cause the system to:
associate a first display management entity with a first physical location in a physical space using a first marker;
store first display parameters for the first display management entity;
associate a second display management entity with a second physical location in the physical space using a second marker;
store second display parameters for the second display management entity;
display first augmented reality content at the first location associated with the first marker and display a first visual entity between the first marker and the first augmented reality content using the first display parameters, wherein the first visual entity includes a first structure on which the first augmented reality content is displayed and the first visual entity includes a first scale indicator that includes a first additional object that is scaled in size similar to the first augmented reality content and displayed with the first augmented reality content; and
display second augmented reality content at the second location associated with the second marker and display a second visual entity between the second marker and the second augmented reality content using the second display parameters, wherein the second visual entity includes a second structure on which the second augmented reality content is displayed and the second visual entity includes a second scale indicator that includes a second additional object that is scaled in size similar to the second augmented reality content and displayed with the second augmented reality content.

16. The system of claim 15, wherein the first augmented reality content and the second augmented reality content are generated from a same content.

17. The system of claim 15, wherein the first augmented reality content and the second augmented reality content are generated from different content.

18. The system of claim 17, wherein the instructions further cause the system to:
receive a user input;
responsive to the user input:
display the first augmented reality content at the second location associated with the second marker using the second display parameters; and
display third augmented reality content at the first location associated with the first marker using the first display parameters.

19. The system of claim 15, wherein the instructions further cause the system to:
receive a user input;
responsive to the user input:
apply a transformation to the first display parameters; and
display the first augmented reality content at the first location associated with the first marker using the transformed first display parameters.

20. The system of claim 19, wherein the instructions further cause the system to:
responsive to the user input:
apply the transformation to the second display parameters; and
display the second augmented reality content at the second location associated with the second marker using the transformed second display parameters.

* * * * *